F. J. MACHALSKE.
PROCESS OF MAKING SOLUBLE PHOSPHATES.
APPLICATION FILED NOV. 6, 1907.
902,425.
Patented Oct. 27, 1908.
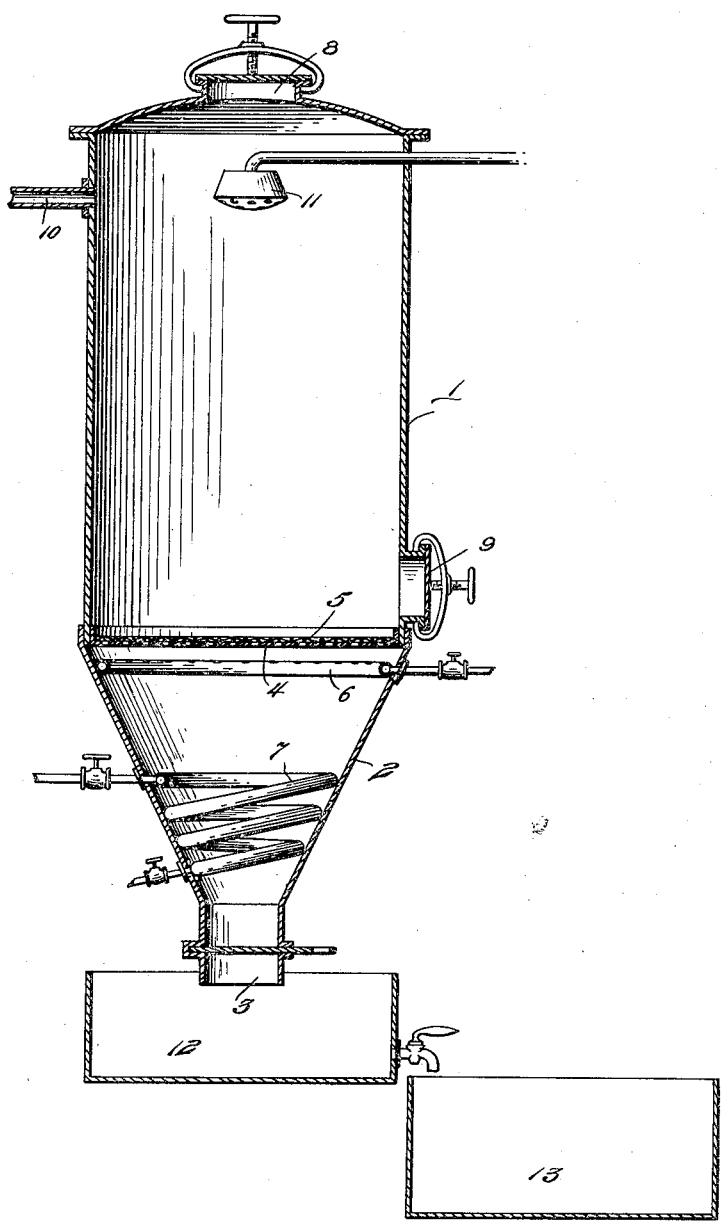

UNITED STATES PATENT OFFICE.

FLORENTINE J. MACHALSKE, OF NIAGARA FALLS, NEW YORK, ASSIGNOR TO AMERICAN REDUCTION COMPANY, OF PITTSBURG, PENNSYLVANIA.

PROCESS OF MAKING SOLUBLE PHOSPHATES.

No. 902,425.  Specification of Letters Patent.  Patented Oct. 27, 1908.

Application filed November 6, 1907. Serial No. 400,947.

*To all whom it may concern:*

Be it known that I, FLORENTINE J. MACHALSKE, a citizen of the United States, residing at Niagara Falls, in the county of Niagara and State of New York, have invented certain new and useful Improvements in Methods of Preparing Soluble Phosphates, of which the following is a specification.

This invention relates to the production of soluble phosphates, and the object of the invention is to effect their production in a higher state of purity and in a more efficient and economical manner than has heretofore been possible.

According to methods heretofore used for the production of superphosphates, a phosphate rock or other material containing tricalcium phosphate is mixed with sulfuric acid in proportion to yield either di-calcium phosphate or mono-calcium phosphate or a mixture of these, as expressed by the following equations:

(1) $Ca_3P_2O_8 + H_2SO_4 = CaSO_4 + Ca_2H_2P_2O_8.$
(2) $Ca_3P_2O_8 + 2H_2SO_4 = 2CaSO_4 + CaH_4P_2O_8.$

In either case the sulfuric acid used appears in the product as calcium sulfate, and is doubly disadvantageous as unnecessarily diluting the soluble phosphate, and as giving rise under certain conditions to the effect known as "reversion," whereby the soluble phosphate reverts to a less soluble or insoluble form.

According to my invention a phosphate rock or other source of phosphoric acid is subjected to the action of sulfur dioxid in the presence of a limited proportion of water, or of sulfurous acid, under such conditions that the phosphoric acid is rendered soluble and calcium sulfite is formed. The reaction may occur with or without the application of heat or pressure and is exemplified by the following equation:

(3) $Ca_3P_2O_8 + 2SO_2 + 2H_2O =$ 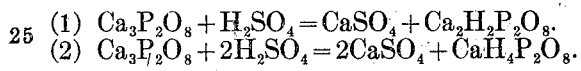
$CaH_4P_2O_8 + 2CaSO_3.$

The soluble phosphate is dissolved in a suitable solvent, as water containing sulfur dioxid, thereby separating it from a residue consisting in part or entirely of calcium sulfite. The calcium sulfite may then be burned or calcined for the production of sulfur dioxid for the continuance of the process as per equation:

(4) $CaSO_3 + heat = CaO + SO_2.$

The mechanical losses of sulfur dioxid incident to the process may be supplied by burning sulfur or other source of sulfur dioxid with the sulfite, or by the introduction of sulfur dioxid derived from any suitable source.

The dissolved phosphate may be separated out by concentration methods or otherwise utilized. It may be conveniently converted into sodium phosphate by reaction with sodium sulfate according to the equation:

(5) $CaH_4P_2O_8 + Na_2SO_4 = 2NaH_2PO_4 + CaSO_4$ the soluble sodium phosphate being readily separated from the insoluble calcium sulfate. Or by treatment with calcium hydroxid it may be converted into di-calcium phosphate as per equation:

(6) $CaH_4P_2O_8 + Ca(OH)_2 =$ 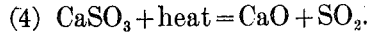
$Ca_2H_2P_2O_8 + 2H_2O.$

The soluble calcium phosphates obtained as above are free from calcium sulfate and hence may be more cheaply transported than the commercial superphosphates and possess a higher fertilizing value; their production moreover proceeds without loss of sulfur other than incidental losses of manufacture, whereas in the production of commercial superphosphates the sulfuric acid used is necessarily lost. Instead of separating the soluble phosphate by concentration of its solution, the solution may be mixed with tankage or other suitable filler. By suitably controlling the amount of water employed for solution the necessity of concentration may be avoided.

The method may be carried out in any desired type of apparatus, one form of which is illustrated in the accompanying drawing wherein the figure is a central vertical section.

Referring to the drawing, 1 represents a cylindrical vessel having a conical bottom 2 with a valved central discharge aperture 3 for the liquid contents. Within the vessel is a transverse perforated plate 4 supporting a filter 5, above and upon which the phosphate rock is disposed. 6 represents a perforated pipe for the admission of live steam to the interior of the vessel, and 7 a closed steam coil. 8, 9 are apertures provided with suitable closures and serving respectively for charging the phosphate rock and removing the undissolved residue.

In operation the moist ground rock or sludge is charged into the vessel through the aperture 8, the apertures closed, and sulfur dioxid is forced into the vessel through pipe 10 by means of a pump until a pressure of 40-60 pounds per square inch is reached. Thereafter it is permitted to react for a suitable period, as an hour or more, when hot or cold water, preferably the former, is turned into the vessel and distributed over and through the charge by means of a spray nozzle 11. The pressure within the vessel will quickly disappear owing to the absorption of the gas by the water, whereupon the liquid contents of the vessel, comprising a strong solution of calcium phosphate containing a small proportion of calcium sulfite, are discharged into a suitable tank 12 through the filter, and such calcium sulfite as may accompany the liquid is permitted to settle out. The clear liquid containing the soluble phosphate may then be drawn into another vessel, 13, and mixed therein with tankage or the like or utilized for the preparation of a fertilizer of any desired composition.

If the phosphate rock in the vessel or digester, after the usual leaching, is shown by test to retain considerable proportions of phosphoric acid the operation may be repeated. When the extraction of the phosphoric acid is commercially complete the residue, consisting largely of calcium sulfite, is removed from the vessel, dried, and burned for the production of sulfur dioxid which is utilized in the repetition of the process.

I claim:

1. The method of making soluble phosphates which consists in reacting with sulfur dioxid gas in the presence of a limited proportion of water upon tri-calcium phosphate under conditions yielding a soluble phosphate and calcium sulfite, and leaching out the phosphate by a suitable solvent, thereby obtaining a strong solution of calcium phosphate containing a small proportion of calcium sulfite.

2. The method of making soluble phosphates which consists in reacting with sulfur dioxid gas in the presence of a limited proportion of water upon tri-calcium phosphate under conditions yielding a soluble phosphate and calcium sulfite, and leaching out the phosphate by a dilute solution of sulfur dioxid, thereby obtaining a strong solution of calcium phosphate containing a small proportion of calcium sulfite.

3. The cyclical method of making soluble phosphates which consists in reacting with sulfur dioxid gas on moistened tri-calcium phosphate, leaching out with a dilute solution of sulfur dioxid the soluble phosphate produced, thereby obtaining a strong solution of calcium phosphate containing a small proportion of calcium sulfite decomposing the residual calcium sulfite to produce sulfur dioxid, and utilizing said sulfur dioxid in the continuation of the process.

In testimony whereof, I affix my signature in presence of two witnesses.

FLORENTINE J. MACHALSKE.

Witnesses:
HENRY KIRKLAND,
JAMES BAKER.